B. B. MARTIN.
COMBINATION SLED.
APPLICATION FILED OCT. 11, 1916.
1,404,990.
Patented Jan. 31, 1922.
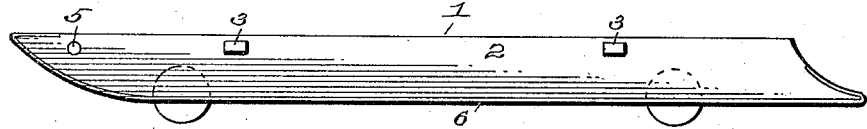
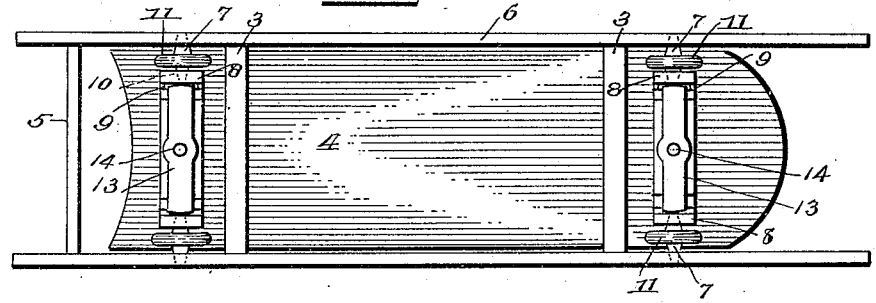
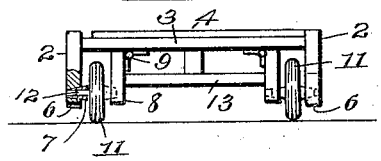 
Inventor
Bert B. Martin,

# UNITED STATES PATENT OFFICE.

BERT B. MARTIN, OF ADA, OHIO.

COMBINATION SLED.

1,404,990. Specification of Letters Patent. Patented Jan. 31, 1922.

Application filed October 11, 1920. Serial No. 416,046.

*To all whom it may concern:*

Be it known that I, BERT B. MARTIN, a citizen of the United States, residing at Ada, in the county of Hardin and State of Ohio, have invented certain new and useful Improvements in Combination Sleds; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the class of toys, but more particularly to a combination sled, and the invention has for its object to provide a sled which can be quickly changed from a snow sled to a wheeled land vehicle, in such manner that the toy can be used in summer as well as in winter, and in this way combines two toys in one.

With this object in view the invention consists of the novel construction of a sled, as will be first fully described and afterwards specifically pointed out in the appended claim.

Referring to the accompanying drawing:

Fig. 1 is an elevation of a sled constructed in accordance with this invention.

Fig. 2 is a bottom plan view of the same.

Fig. 3 is a partial vertical transverse sectional view through Fig. 1, and

Fig. 4 is a view illustrating the sled arranged for use in snow with the wheels removed.

Like numerals of reference indicate the same parts throughout the several figures, in which:

1 indicates the sled having the sides 2, cross braces 3, top 4, foot rest 5 and iron runners 6.

7 indicates cone bearings positioned in the sides 2 of the sled, and 8 indicates blocks or brackets hinged at 9 to the underside of the top 4; each block 8 having a cone bearing 10 therein in alinement with the cone bearings 7 in the sides 2.

11 indicates the preferably rubber-tired wheels having stationary axles or hubs 12 which enter the cone bearings as shown.

13 indicates a block spreader and lock, the same being pivoted at 14 to the top 4 between each pair of blocks 8, and of a length so that when the spreader is turned crosswise of the sled, the ends of the spreader 13 engage the blocks 8 as shown in Fig. 3 and hold said blocks in proper vertical position.

When using the sled as a land vehicle, the spreader 13 is turned out of engagement with the blocks 8; the blocks are swung up under the bottom side of the top 4; the wheels are dropped out, and the spreader is again turned crosswise of the sled and over the blocks 8, as shown in Fig. 4, which then effectually holds the blocks up closely under the bottom side of the top 4.

Having thus described my invention, I do not wish to be understood as limiting myself to the exact construction set forth, but consider myself clearly entitled to all changes and modifications as fall within the limit the scope of the appended claim.

What I claim as new and desire to secure by Letters Patent of the United States, is:

A combination sled including sides, runners and top, brackets under the top, wheels removably mounted in the sides and brackets, and a spreader engaging the brackets to maintain same in proper operative position.

In testimony whereof, I affix my signature in presence of two witnesses.

BERT B. MARTIN.

Witnesses:
H. M. BUCHELL,
JACOB WEINBERG.